United States Patent [19]

Kawamura et al.

[11] Patent Number: 5,636,655
[45] Date of Patent: Jun. 10, 1997

[54] AUTO-DRAINAGE ASSEMBLY

[75] Inventors: Junya Kawamura; Yasuhisa Kimura, both of Yawara-mura, Japan

[73] Assignee: SMC Corporation, Tokyo, Japan

[21] Appl. No.: 481,389

[22] PCT Filed: Nov. 15, 1994

[86] PCT No.: PCT/JP94/01931
§ 371 Date: Jul. 7, 1995
§ 102(e) Date: Jul. 7, 1995

[87] PCT Pub. No.: WO95/14188
PCT Pub. Date: May 26, 1995

[30] Foreign Application Priority Data

Nov. 15, 1993 [JP] Japan ................. 5-308745
Nov. 18, 1993 [JP] Japan ................. 5-066463
Apr. 26, 1994 [JP] Japan ................. 6-110374

[51] Int. Cl.$^6$ ................. F16T 1/20
[52] U.S. Cl. ................. 137/181; 137/195
[58] Field of Search ................. 137/181, 195

[56] References Cited

U.S. PATENT DOCUMENTS 758,965  5/1904  Gulland ................. 137/195
849,401  4/1907  Kelley ................. 137/195
3,993,090  11/1976  Hankison ................. 137/195

FOREIGN PATENT DOCUMENTS 52-23717  2/1977  Japan ................. 137/195

Primary Examiner—Gerald A. Michalsky
Attorney, Agent, or Firm—Oblon, Spivak, McClelland, Maier & Neustadt, P.C.

[57] ABSTRACT

An auto-drainage assembly to be inserted into a pneumatic piping system which supplies pressurized air to a pneumatically operating machine, for separating a drain liquid from the piping. The auto-drainage assembly is the type which includes a drain reservoir case, a hollow discharge guide shaft fitted in position at the bottom of the reservoir case, a drain valve seat provided within the discharge guide shaft for discharging the drain liquid to the outside, a hollow piston driven by pressurized air supplied to a pilot chamber in relation with upward and downward movements of a float within the drain reservoir case, and a drain valve body provided on the piston. The drain valve body is constituted by an annular seal member which is fitted on the outer periphery of the piston, and a large number of drain discharge grooves are provided on the inner periphery of the discharge guide shaft in such a way as to define a corresponding number of guide surfaces between the respective drain discharge grooves. As the drain valve body is moved up and down for opening and closing the drain valve seat, the seal member is guided along the guide surfaces between the drain discharge grooves to prevent dislocation of the seal member under the influence of gushing streams of the drain liquid being discharged.

8 Claims, 15 Drawing Sheets

AUTO-DRAINAGE ASSEMBLY

BACKGROUND OF THE INVENTION

1. Field of the Art

This invention relates to a normally closed or normally open auto-drainage assembly (hereinafter referred to simply as "auto-drain" for brevity) to be inserted into a pneumatic piping system, which supplies pressurized air to a pneumatically operating machine, for the purpose of separating and discharging a drain liquid from the pneumatic piping.

2. Description of the Prior Art

Auto-drains have been known and in use for automatically discharging a drain liquid, including two types of auto-drains: a normally closed auto-drain which is arranged to hold a drain valve body normally in a closed position in relation with a downward movement of a float to stop drain discharges when a drain reservoir case is internally in a pressurized state under the influence of a prevailing fluid pressure and when the drain liquid level is at a low position, opening the drain valve body and discharging the drain liquid out of the reservoir case as soon as the drain liquid level rises to push up the float; and a normally open auto-drain which is arranged to hold a drain valve body normally in an open position to discharge a drain liquid when a drain reservoir case is in a non-pressurized state, closing a drain discharge passage with the drain valve body to stop drain discharging when the reservoir case is internally pressurized similarly unless the float is pushed up by elevation of the drain liquid level.

Illustrated by way of example in FIG. 15 is a conventional normally closed auto-drain 1 including: a drain reservoir case 2 for storing a drain liquid which flows in from above along with pressurized air; a drain discharge guide sleeve 3 which is fitted in an opening at the bottom of the case 2; a drain valve seat 4 which is formed on the inner periphery of a hollow discharge guide shaft 3; a manual valve support member 5 which is fixed on a lower portion of the discharge guide shaft 3; and a manual operating member 6. Below the drain valve seat 4, the discharge guide shaft 3 is formed in a larger diameter than the drain valve seat 4 to provide a drain discharging passage.

A float guide 8 which is connected to an upper portion of the discharge guide shaft 3 is provided with a cylindrical guide portion to guide upward and downward movements of a float 9. A hollow cylindrical piston 10 is slidably fitted in the float guide 8, the piston 10 having a drain valve body (a seal member) 11 fitted on the circumference of its lower hollow shaft portion to close and open a drain passage by seating and unseating the drain valve body on and off the drain valve seat 4.

Defined by the piston 10 within the float guide 8 are an upper pilot chamber 12 and a lower pressure chamber 13 which is communicated with the reservoir case 2 through radial intercommunicating slots 8a. A pilot valve seat 14 opening into the pilot chamber 12 is formed at the upper end of the cylindrical guide portion of the float guide. The pilot valve seat 14 is opened and closed by a pilot valve body 15 which is mounted on a lever 17, which is in turn rockably supported at one end thereof on the upper end of the float guide 8 and linked at the other end to the float 9 through a holder member 18. The piston 10 is internally provided with a partition wall which is formed with an orifice 19 of a smaller diameter than the above-described pilot valve seat 14, thereby communicating the pilot chamber 12 with the inner cavity of the hollow cylindrical piston 10 which is opened to the outside through the manual operating member 6. Further, a first spring 21 is charged in the pilot chamber 12 to bias the piston 10 in the downward direction, while a second spring 22 is charged between the piston 10 and a lifting tube 6a of the manual operating member 6 to bias the piston 10 in the upward direction.

With the known auto-drain of the above-described construction, the float 9 is lowered to close the pilot valve seat 14 with the pilot valve body 15 when the reservoir case is internally pressurized by influent pressurized air and the drain liquid level is at a low position as shown in the drawing, communicating the pilot chamber 12 with the outside through the orifice 19 and holding the piston 10 in a neutral position under the influence of the opposingly acting forces of the springs 21 and 22, and thus closing the drain valve body 11 on the drain valve seat 4.

As the float 9 is pushed up by a rising drain liquid level, the lever 17 is turned counterclockwise in the drawing, and therefore the pilot valve body 15 is unseated to open the pilot valve seat 14, permitting pressurized air in the case 2 to flow into the pilot chamber 12. As a result, the piston 10 is moved in the downward direction, unseating the drain valve body 11 to open the drain valve seat 4, discharging the drain liquid in the case 2 to the outside through the radial intercommunicating slots 8a and the lifting tube 6a of the manual operating member 6 via the circumference of the drain valve body 11.

When the float 9 is lowered by a drop of the drain liquid level, the pilot valve body 15 is seated to close the pilot valve seat 14, and the air pressure in the pilot chamber 12 is gradually reduced by air bleeding through the orifice 19. Consequently, the piston 10 is gradually returned to the neutral position, seating the drain valve body 11 in closed state on the drain valve seat 4 after a lapse of a short time period to stop the drain discharging.

In case of the known auto-drain as described above, due to the existence of a clearance between the drain valve body 11 on the outer periphery of the piston 10 and the inner periphery of the discharge guide shaft 3, the downward movements of the piston 10 toward the drain discharging position involve problems such as inclinations of the piston 10 during its downward movements or dislocation of the drain valve body or seal member 11 from its position on the drain valve body 11 under the influence of gushing streams of the drain liquid being discharged. Therefore, the piston 10 sometimes fails to return to the initial position or the drain valve seat 4 is left open after finishing a drain discharging operation.

Although the problems or drawbacks of conventional auto-drains have been explained above in connection with a normally closed type auto-drain, the same applies to normally open type auto-drains which are arranged to hold the drain valve normally in an unseated open position off the drain valve seat when no pressure prevails in the reservoir case 2.

Further, despite the similarities in function between the normally closed and normally open auto-drains, it has been the usual practice to build these two types of auto-drains by completely separate fabrication processes due to difficulties of using common component parts for the two types of auto-drains. In this regard, from the standpoint of reducing the production cost and facilitating the management of component parts, it is desirable to develop a universal auto-drain construction which can be arranged into either a normally closed type or a normally open type basically by the use of common component parts.

SUMMARY OF THE INVENTION

It is an object of the present invention to provide an auto-drain which can ensure stabilized and secure operations of a drain valve body free from the above-described problems with conventional auto-drains.

It is another object of the invention to provide an auto-drain which is arranged to preclude inclinations of a piston or dislocations of a seal member, which constitutes a drain valve body, by guiding the drain valve body along guide surfaces provided between drain discharge grooves when the drain valve body is moved up and down by the piston to open and close a drain valve seat.

It is still another object of the invention to provide an auto-drain which is adaptable to operate either as a normally closed type or as a normally open type by the use of common component parts.

It is a further object of the invention to provide an auto-drain with a manual drain discharging mechanism which is simple in construction and stabilized in operation.

In accordance with the present invention, the above-stated objectives are achieved by the provision of an auto-drainage assembly essentially including a drain reservoir case, a hollow discharge guide shaft fitted in an opening the bottom of the drain reservoir case, a drain valve seat formed in the discharge guide shaft for discharging a drain liquid therethrough, a piston slidably received in a pilot chamber in communication with the drain reservoir case through a pilot valve seat to be opened and closed in relation with upward and downward movements of a float within the drain reservoir case, and a drain valve body provided on the piston for opening and closing the drain valve seat, characterized in that the auto-drain comprises: an annular seal member fitted on the outer periphery of the piston to serve as the drain valve body; and a large number of drain discharge grooves formed on the inner periphery of the discharge guide shaft alternately with guide surfaces to be brought into sliding contact with the drain valve body when unseated from the drain valve seat, the guide surfaces being arranged in a diameter substantially same as or slightly larger than the drain valve seat. Alternatively, the above-described auto-drain is characterized by the provision of: an annular seal member fitted in the inner periphery of the discharge guide shaft to serve as the drain valve seat; and a large number of drain discharge grooves formed on the circumferential surface of the drain valve body alternately with guide surfaces to be brought into sliding contact with the seal member when the drain valve body is unseated from the drain valve seat, the guide surfaces being arranged in a diameter substantially same as or slightly smaller than the drain valve seat.

In a more specific form of the invention, the auto-drain comprises: a drain reservoir case; a discharge guide shaft fitted in an opening at the bottom of the case; a drain valve seat provided in the discharge guide shaft for discharging a drain liquid therethrough; a hollow float guide erected on the discharge guide shaft for guiding a float up and down therealong; a piston slidably fitted in the float guide and defining a pilot chamber therein; a pilot valve seat opening into the pilot chamber; a pilot valve body disposed rockably and in face to face relation with the pilot valve seat to open and close same in relation with upward and downward movements of the float; a drain valve body provided on the piston to open and close the drain valve seat by sliding movements of the piston; and either a normally closing spring charged between spring seats provided on the discharge guide shaft and the piston to bias the piston in the direction of closing the drain valve body on the drain valve seat, or a normally opening spring charged in the pilot chamber between spring seats provided on the float guide and the piston to bias the piston in the direction of unseating the drain valve body from the drain valve seat. In this case, one can selectively mount on the auto-drain either a normally closing spring or a normally opening spring whichever is suitable in terms of the purpose of use of the auto-drain.

Further, in the above-described auto-drain, interlocking portions may be provided oppositely on the piston which carries the drain valve body, and on a manual operating member, which is inserted in the discharge guide shaft, in such a way that, upon moving the manual operating member downward, the interlocking portions are engaged with each other, causing the piston to move downward together with the manual operating member to open the drain valve seat.

In case the above-described auto-drain is assembled as a normally closed type, the drain valve body is normally seated on the drain valve seat under the influence of the biasing force of the normally closing spring to suspend the drain discharge while the reservoir case is internally pressurized by influent pressurized air and the drain liquid level is at a low position. In this state, if the drain liquid level rises to push up the float, the pilot valve body is unseated to open the pilot valve seat, letting pressurized air in the reservoir case flow into the pilot chamber. As a result, the piston is moved downward by the action of the air pressure prevailing in the pilot chamber, unseating the drain valve body off the drain valve seat to discharge the drain liquid.

If the drain liquid level drops as a result of a drain discharging operation, the float is lowered to close the pilot valve body on the pilot valve seat, followed by a drop of the air pressure in the pilot chamber due to air bleeding from the pilot chamber through the afore-mentioned orifice. Consequently, the piston is allowed to return to its initial position, closing the drain valve body on the drain valve seat to stop the drain discharging.

On the other, in case the auto-drain is assembled as a normally open type, the piston is moved downward under the influence of the biasing force of the normally opening spring to unseat the drain valve body off the drain valve seat when the drain reservoir case is internally in a non-pressurized state, discharging the drain liquid without storing in the reservoir case. When the case is internally pressurized by influent pressurized air, the auto-drain operates in the same manner as in the case of the above-described normally closed type.

In operation of the above-described auto-drain, either the drain valve body which is formed by fitting a seal member on a fore end portion of the piston or the drain valve seat which is formed by fitting an annular seal member on the inner periphery of the discharge guide shaft is slid always under guidance of the guide surfaces which are formed between the respective drain discharge grooves, thereby ensuring stabilized upward and downward movements of the piston free of inclinations or similar staggering motions and at the same time preventing dislocations of the seal member from its fitted position. Upon unseating the drain valve body off the drain valve seat, the drain liquid is discharged through the drain discharge grooves smoothly even through the guide surfaces are constantly held in abutting engagement with the seal member.

Thanks to the provision of the spring seats for a normally closing spring to be charged between the discharge guide shaft and the piston and the spring seats for a normally opening spring to be charged between the float guide and the piston within the pilot chamber, one can arbitrarily select either a normally closing spring or a normally opening spring to use the auto-drain as a normally closed type or a normally open type. Accordingly, it becomes possible to fabricate normally closed and normally open auto-drains by the use of common component parts, or to change the auto-drain easily from a normally closed type to a normally open type or vice versa.

In addition, the interlocking portions which are provided opposingly on the piston, which carries the drain valve body, and on the manual operating member, which is inserted in the discharge guide shaft, are brought into engagement with each other when the manual operating member is pulled down for a manual discharging operation, lowering the piston with the manual operating member to open the drain valve seat for discharging the drain liquid therethrough. In this instance, the drain liquid can be discharged manually through the same drain valve seat as in the automatic drain discharging operations, free of clogging of a drain discharge passage or passages or adhesion of the seal member which might take place in case the drain liquid is discharged through a drain discharge passage or passages designed exclusively for manual discharging operations.

BEST MODE FOR CARRYING OUT THE INVENTION

Figure 1:
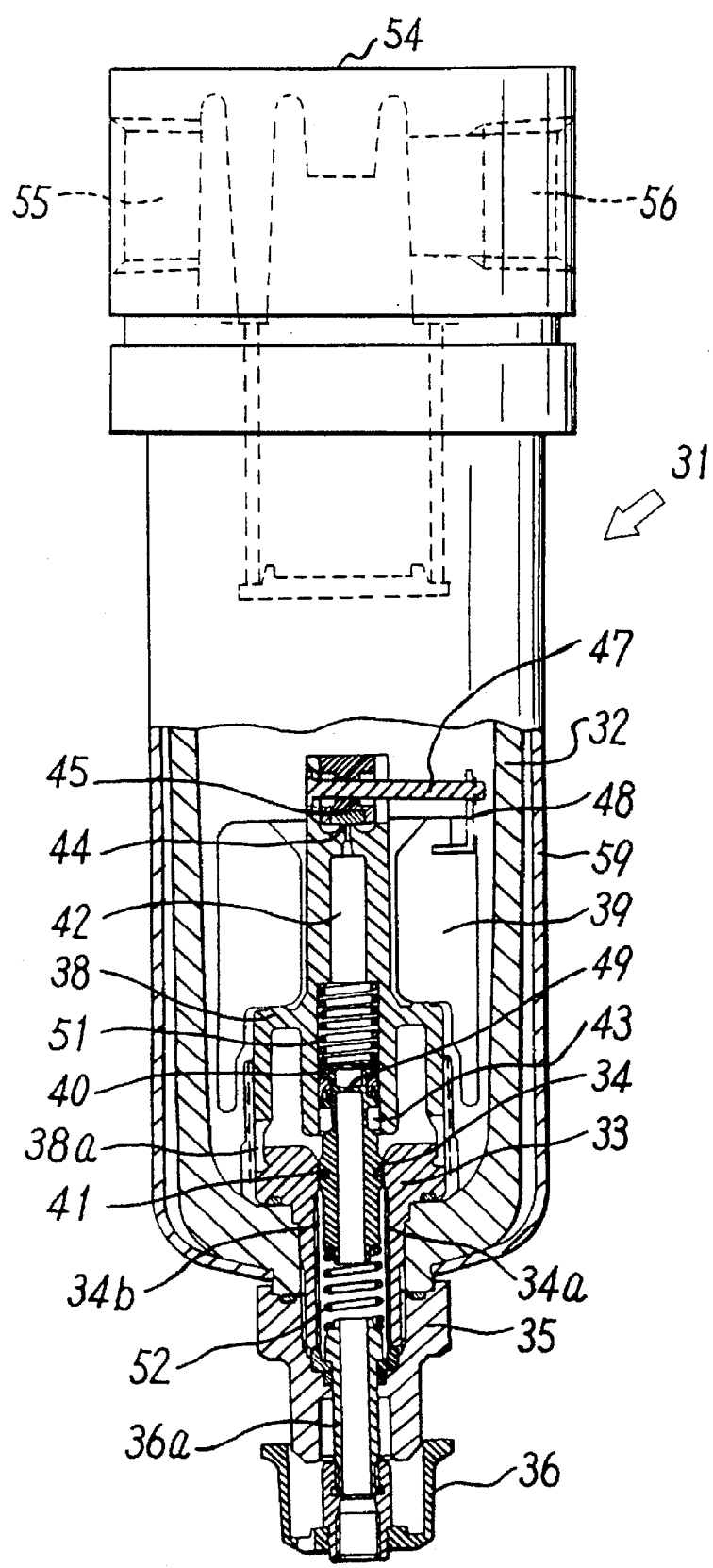
FIG. 1 is a vertically sectioned front view of a first embodiment of the invention, which is arranged as a normally closed auto-drain.
Figure 2:
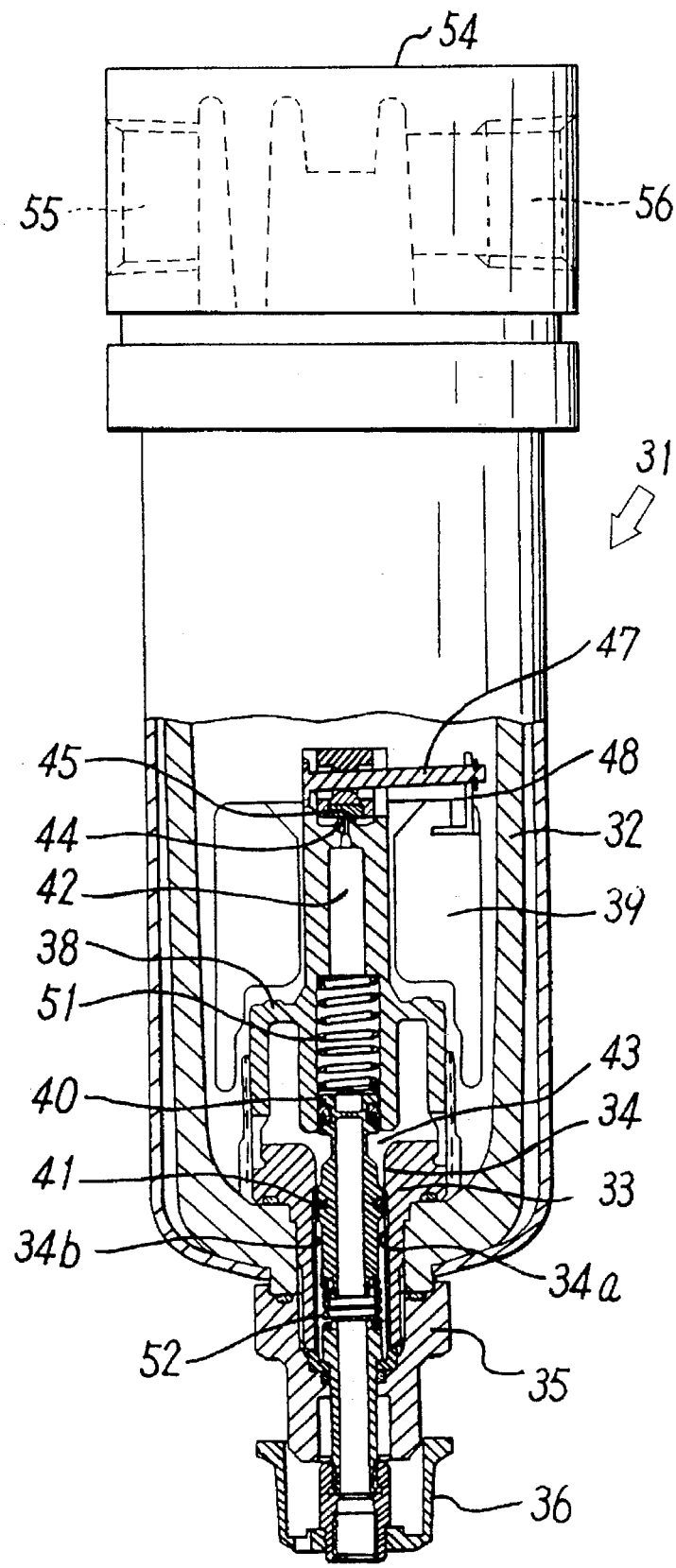
FIG. 2 is a view similar to FIG. 1, but showing the auto-drain in a drain discharging phase of operation.
Figure 3:
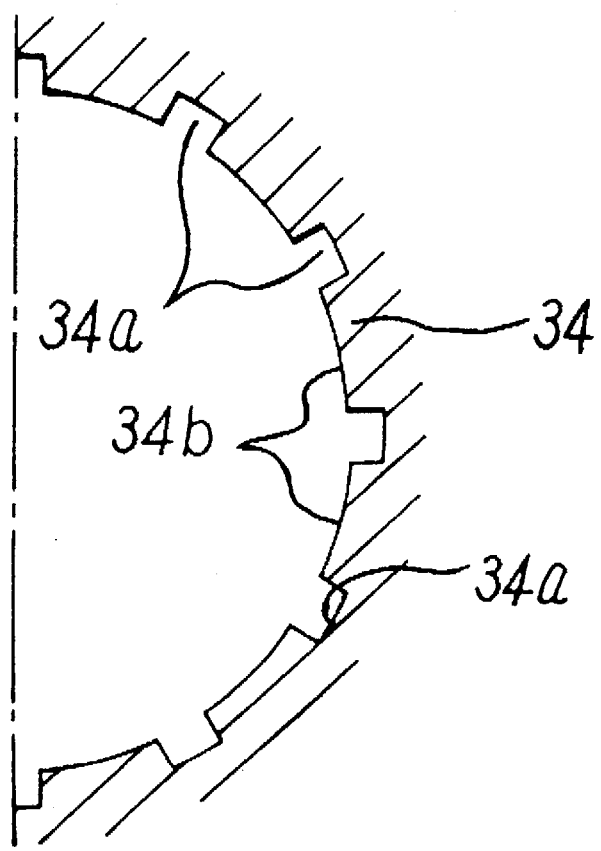
FIG. 3 is a fragmentary cross section of a discharge guide shaft.

Referring to FIGS. 1 to 3, there is shown a first embodiment of the present invention, which is arranged as a normally closed auto-drain 31 and which includes: a drain reservoir case 32 for storing a drain liquid which flows in from above along with pressurized air; a hollow drain discharge guide shaft 33 which is fitted in an opening at the bottom of the reservoir case 32; a drain valve seat 34 which is formed on the inner periphery of the discharge guide shaft 33; a manual valve support member 35 mounted on a lower portion of the discharge guide shaft 33; and a manual operating member 36. Erected contiguously on the discharge guide shaft 33 is a hollow float guide 38 which in turn slidably receives therein a hollow piston 40. A drain valve body 41 in the form of an annular seal ring is fitted on the circumference of a hollow shaft portion, which forms a lower extension of the piston. In relation with axial sliding movements of the piston 40, the drain valve body 41 is seated on and unseated from the drain valve seat 34 for closing and opening a drain discharge passage which is defined by the drain valve seat 34.

As shown particularly in FIG. 3, a large number of axial drain discharge grooves 34a are formed on the inner peripheral surface of the discharge guide shaft 33 beneath the drain valve seat 34. These drain discharge grooves 34a are spaced from each other in such a way as to define a corresponding number of guide surfaces 34b between the respective drain discharge grooves 34a. These guide surfaces 34b are arranged in a diameter which is substantially same as or slightly larger than the drain valve seat 34.

The above-mentioned float guide 38 is provided with an upright cylindrical guide portion in an upper half of its body for guiding the float 39 up and down therealong, slidably receiving the hollow cylindrical piston 40 in its lower half and defining above the piston 40 a pilot chamber 40 and beneath the piston 40 a pressure chamber 43 which is in communication with the reservoir case 2 through drain communicating slots 38a in the float guide 38. Formed at the upper end of the upright guide portion is a pilot valve seat 44 which is opened into the pilot chamber 42. This pilot valve seat 44 is opened and closed by a pilot valve body which is mounted on a lever 47, which is rockably supported on the upper end of the float guide 38 at one end away from the other end which is linked to the float 39 through a holder member 48.

In a radial partition wall which is provided within the internal cavity of the piston 40, an orifice 49 of a smaller diameter than the pilot valve seat 44 is opened to communicate the pilot chamber 42 with the internal cavity of the piston 40 which is opened to the outside through the manual operating member 36. Further, a first spring 51 is charged in the pilot chamber 42 to urge the piston 40 in the downward direction, while a second spring 52 is charged between the piston 40 and the lifting tube 36a of the manual operating member 36 to urge the piston 40 in the upward direction in the drawing. By the opposing actions of these springs 51 and 52, the piston 40 is retained in a neutral position when no air pressure acts on the piston 40, seating the drain valve body 41 on the drain valve seat 34 in a closed state.

In the drawings, indicated at 54 is a piping manifold, at 55 and 56 are inlet and outlet for pressurized air, respectively, and at 59 a reservoir case guard.

In the normally closed auto-drain of the above-described first embodiment, when the reservoir case 32 is internally pressurized by an influent pressurized fluid and the drain liquid level is at a low position as shown in FIG. 1, the float 39 is lowered to seat the pilot valve body 45 on the pilot valve seat 44 in a closed state, and therefore the piston 40 is retained in the neutral position by the opposingly acting springs 51 and 52, closing the drain valve body 41 on the drain valve seat 34 to stop the drain discharging.

As the float 39 is pushed up by a rising drain liquid level within the reservoir case 32, the lever 47 is turned counter-clockwise as shown in FIG. 2, unseating the pilot valve body 45 off the pilot valve seat 44 to draw pressurized air into the pilot chamber 42 from the reservoir case 32. Consequently, a high air pressure is built up in the pilot chamber 42 (because pressurized air flows into the pilot chamber 42 through the pilot valve seat 44 in a far greater amount as compared with the air bleeding through the orifice 49), so that the piston 40 is moved downward to unseat the drain valve body 41 off the drain valve seat 34, discharging the drain liquid in the reservoir case 32 to the outside through the drain discharge grooves 34a on the inner periphery of the discharge guide shaft 33.

In this instance, the drain valve body 41 which is fitted on the outer periphery of a fore end portion of the piston 40 is held in sliding contact with the guide surfaces 34b between the respective drain discharge grooves 34a to ensure secure and stabilized movements of the piston 40 in the upward and downward directions free of inclinations of the piston 40 itself or dislocation of the drain valve body 41 off its position on the piston 40 under the influence of gushing streams of the drain liquid.

As soon as the float 39 is lowered by a drop of the drain liquid level, the lever 47 is turned clockwise to seat the pilot valve body 45 closed on the pilot valve seat 44. This causes a gradual drop to the air pressure in the pilot chamber 42 due to gradual air bleeding through the orifice 49. Therefore, the piston 40 is now returned to the neutral position under the influence of the biasing forces of the opposingly acting springs 51 and 52, seating the drain valve body 41 closed on the drain valve seat 34 to stop the drain discharging.

In case of a manual drain discharging operation, the manual operating member 36 is moved upward, whereupon the piston 40 is pushed upward by the upper end of the lifting tube 36a through the second spring 52, popping up the drain valve body 41 off the drain valve seat 34 to open the drain discharge passage.

Figure 4:
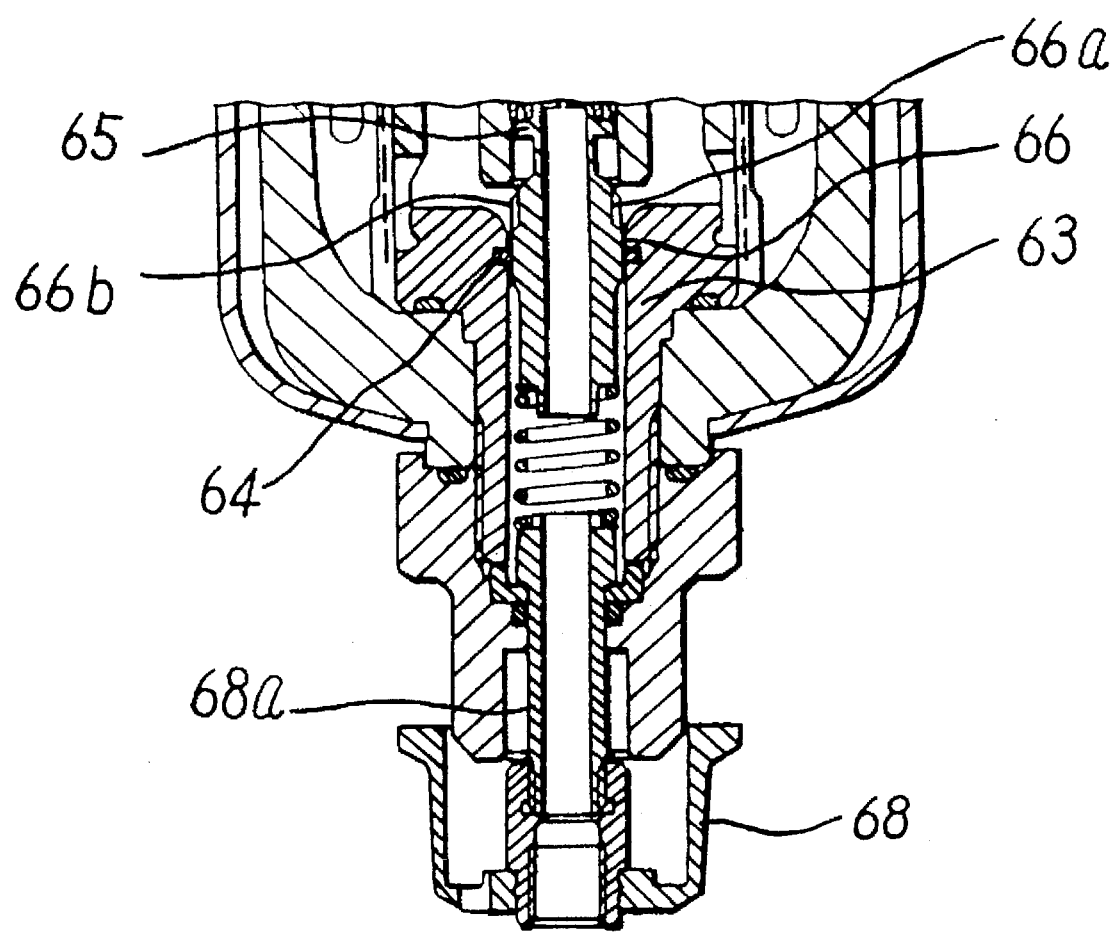
FIG. 4 is a fragmentary vertical section of a second embodiment of the invention.

In the above-described auto-drain of the first embodiment, for closing and opening the drain discharging passage, the drain valve body 41, in the form of an annular seal member which is fitted on the outer periphery of a lower hollow shaft portion of the piston 40, is seated on and off the drain valve seat 34 on the inner periphery of the hollow discharge guide shaft 33. In this connection, a drain valve seat 64 may be formed on the inner periphery of the discharge guide shaft 63 by fitting an annular seal member therein, opening and closing the drain valve seat 64 by a drain valve body 66 which is formed on the outer periphery of a lower shaft portion of a piston 65 as in the case of a second embodiment of the invention shown in FIG. 4.

In this case, a large number of axial drain discharge grooves 66a are formed on the circumferential surface of the hollow shaft portion of the piston 65 above the drain valve body 66, defining between the respective drain discharge grooves 66a a corresponding number of guide surfaces 66b to guide the drain valve seat 64 therealong. The just-mentioned guide surfaces 66b are arranged in a diameter substantially same as or slightly smaller than the diameter of the drain valve body 66. Similar drain discharge grooves and guide surface may be provided additionally under the drain valve body 66 to stabilize the movements of the piston 65 also in a manual discharging operation in which a manual operating member 68 is manually pushed upward to urge the drain valve body 66 into an unseated position upward of the drain valve seat 64 by way of the upper end of a hollow lifting tube 68a.

In the above-described second embodiment, as the piston 65 is moved downward into the drain discharging position, the drain liquid is allowed to flow out through the drain discharge grooves 66a, while the guide surfaces 66b between the respective drain discharge grooves 66a are moved downward in abutting engagement with the seal member of the drain valve seat 64, thereby preventing inclinations of the piston 65 as well as dislocation of the seal member off the discharge guide shaft 63.

In other respects, the second embodiment is same as the foregoing first embodiment in construction and operation, so that detailed descriptions on common points are omitted to avoid repetitions.

Figure 5:
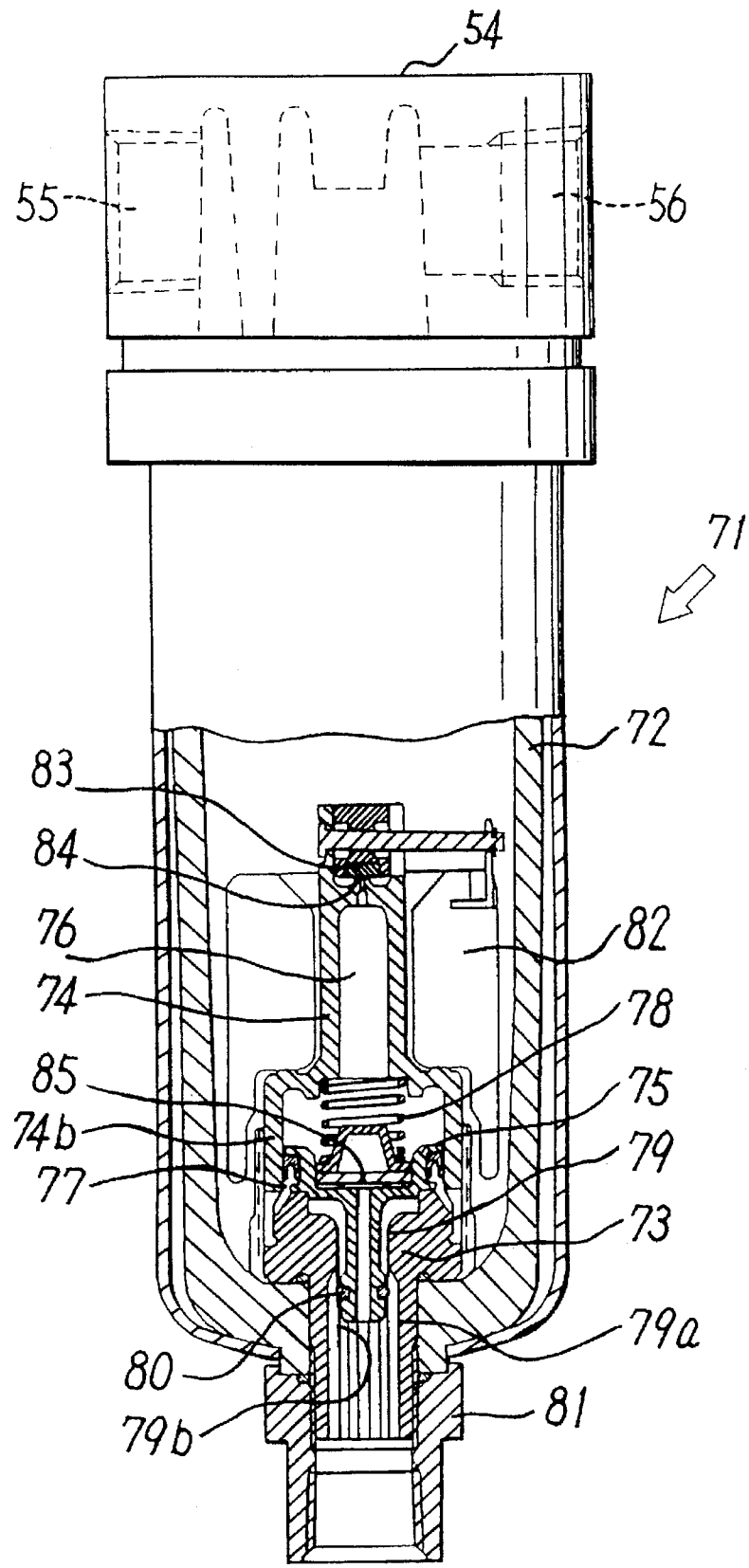
FIG. 5 is a vertically sectioned front view of a third embodiment of the invention, which is arranged as a normally open auto-drain.
Figure 6:
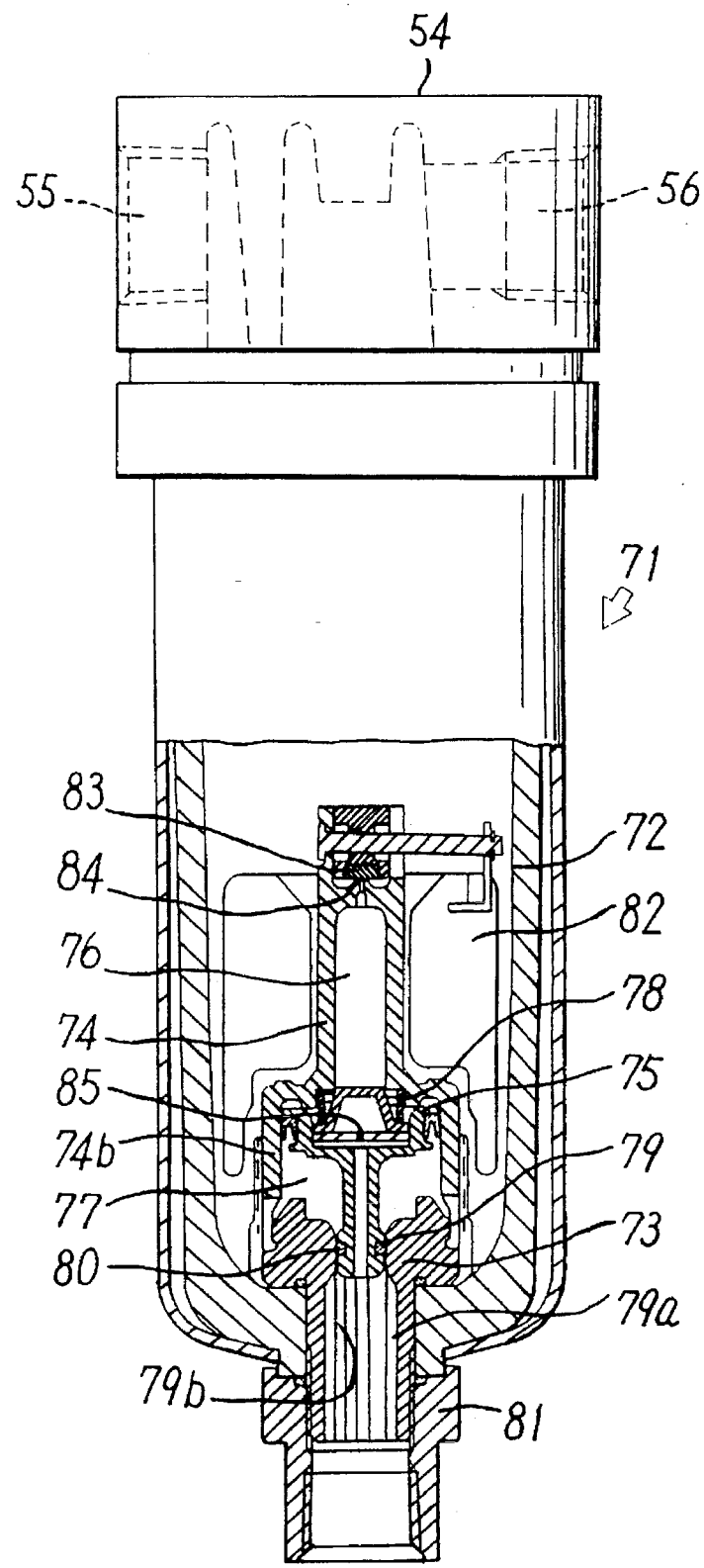
FIG. 6 is a view similar to FIG. 5, but showing the drain valve body of the auto-drain in a seated or closed position.

Referring now to FIGS. 5 and 6, there is shown a third embodiment of the invention, which is arranged as a normally open auto-drain 71. In this normally open auto-drain 71, a piston 75, which has a broader air-pressure receiving area than the counterpart in the first embodiment, is slidably fitted in a lower larger-diameter portion 74b of a float guide 74 which is contiguously erected on a hollow discharge guide shaft 73 within a drain reservoir case 72. The inner cavity of the float guide 74 is divided by the piston 75 into an upper pilot chamber 76 and a lower pressure chamber 77. A normally opening spring 78 is charged in the pilot chamber 76 to urge the piston 75 constantly in the downward direction.

Similarly to the above-described first embodiment, a drain valve body 80 in the form of an annular seal member is fitted on the circumference of a lower hollow shaft portion of the piston 75, the drain valve body 80 being seating on and unseated off a drain valve seat 79 in a hollow discharge guide shaft 73 to close and open a drain discharging passage. The discharge guide shaft 73 is provided with a large number of axial drain discharge grooves 79a on its inner periphery below the drain valve seat 79 in the same manner as described hereinbefore in connection with FIG. 3, the respective drain discharge grooves 79a defining therebetween guide surfaces 79b for the drain valve body 80. These guide surfaces 79b are arranged in a diameter substantially same as or slightly larger than the drain valve seat 79.

Further, a pipe joint member 81 is threaded into the lower end of the hollow discharge guide shaft 73. In other respects, the third embodiment is substantially same as the first embodiment in construction, so that descriptions on common parts are omitted here to avoid repetitions.

In the auto-drain of the above-described third embodiment, the piston 75 is moved downward under the influence of the biasing force of the normally opening spring 78 as long as the reservoir case 72 is internally in a non-pressurized state as shown in FIG. 5, unseating the drain valve body 80 off the drain valve seat 79 to discharge the drain liquid therethrough without storing same in the reservoir case 72.

When the reservoir case 72 is internally pressurized by an influent pressurized fluid and the drain liquid level is at a low position, the float 82 is likewise in a low position seating the pilot valve body 83 closed on the pilot valve seat 84. Therefore, the pilot chamber 76 is communicated with the outside through the orifice 85 in the piston 75, while the air pressure prevails in the pressure chamber 77 which is in communication with the reservoir case 72. Consequently, the piston 75 is moved upward against the biasing action of the normally opening spring 78 as shown in FIG. 6, closing the drain valve body 80 on drain valve seat 79 to stop the drain discharging.

As the drain liquid is stored up to a certain amount lifting up the float 82, the pilot valve body 83 is unseated off the pilot valve seat 84 and whereupon the piston 75 is moved downward by a combined force of the air pressure prevailing in the pilot chamber 76 plus the biasing force of the normally opening spring 78, unseating the drain valve body 80 off the drain valve seat 79 to discharge the drain liquid therethrough.

In a manner similarly to the first embodiment, the drain valve body 80 in the third embodiment is also kept from dislocation from its position.

Figure 7:
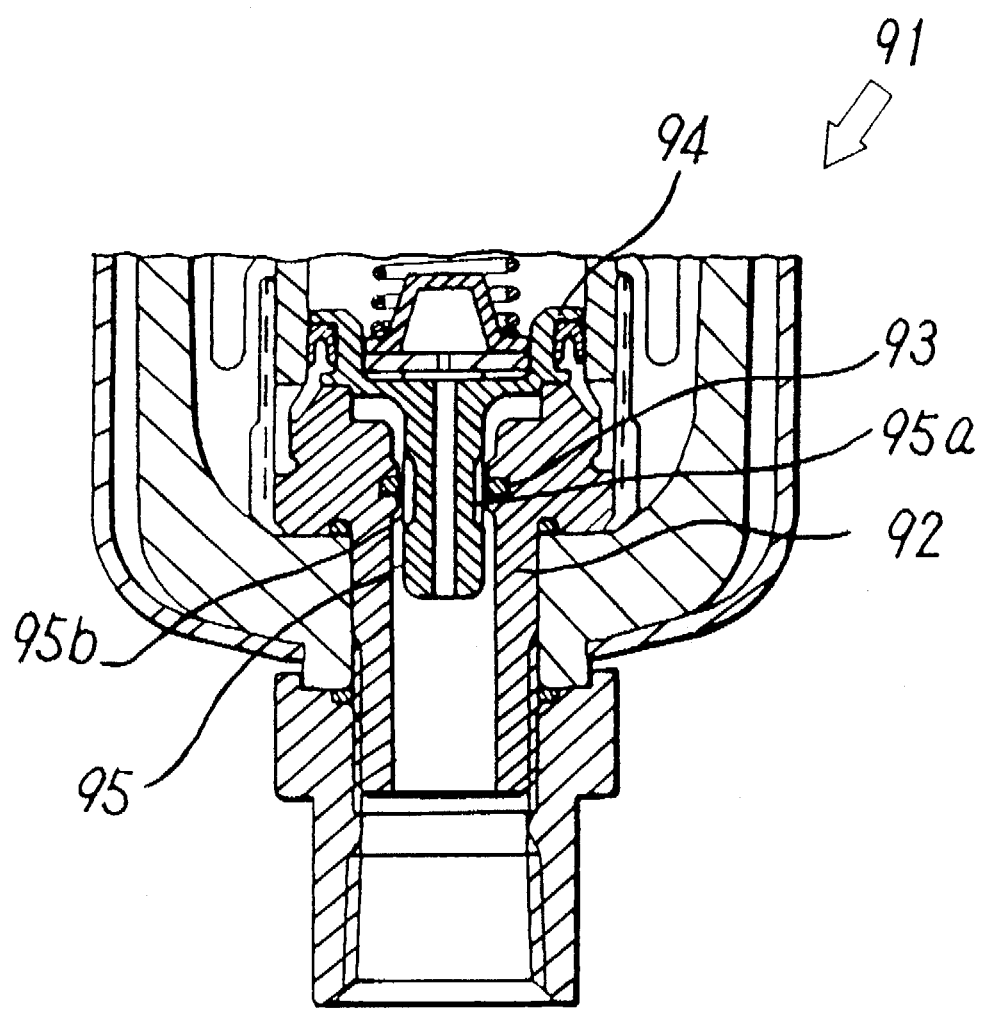
FIG. 7 is a fragmentary vertical section of a fourth embodiment of the invention.

Shown in FIG. 7 is a fourth embodiment of the invention, i.e., an auto-drain 91 which is same as the foregoing third embodiment except for partial modifications in construction. Namely, in this modified embodiment, a drain valve seat 93 is formed by fitting an annular seal member in the inner periphery of a hollow discharge guide shaft 92, and a drain valve body 95 is formed on the outer periphery of a hollow shaft portion of a piston 94 for opening and closing the drain valve seat 93. The piston 93 is provided with a plural number of drain discharge grooves 95a in an intermediate portion of the hollow valve shaft above the drain valve body 95, defining guide surfaces 95b between the respective drain discharge grooves 95a.

In other respects, this fourth embodiment is substantially same as the third embodiment in construction and operation, so that descriptions on common parts are omitted here to avoid repetitions.

Figure 8:
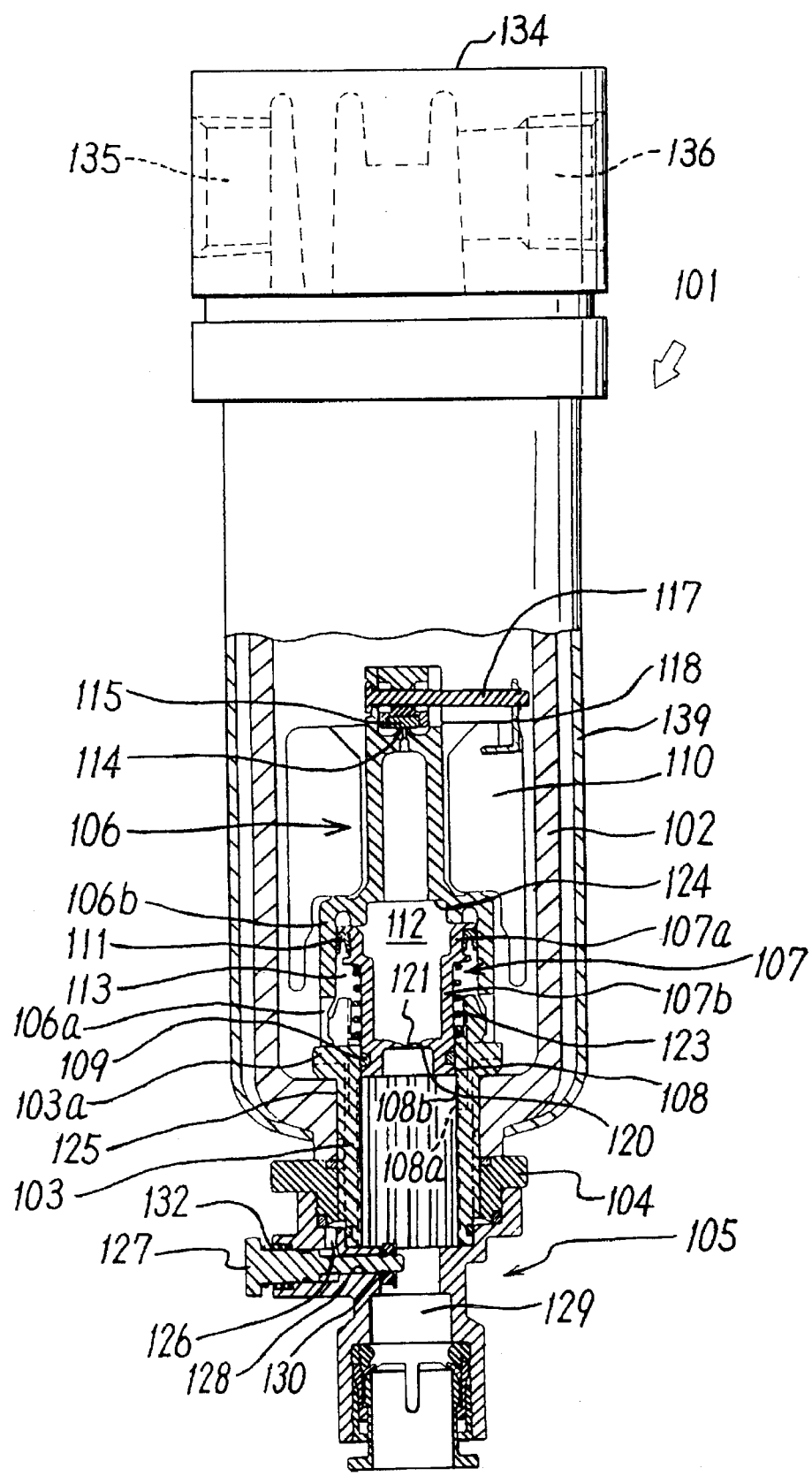
FIG. 8 is a vertically sectioned front view of a fifth embodiment of the invention, which is arranged as a normally closed auto-drain.
Figure 9:
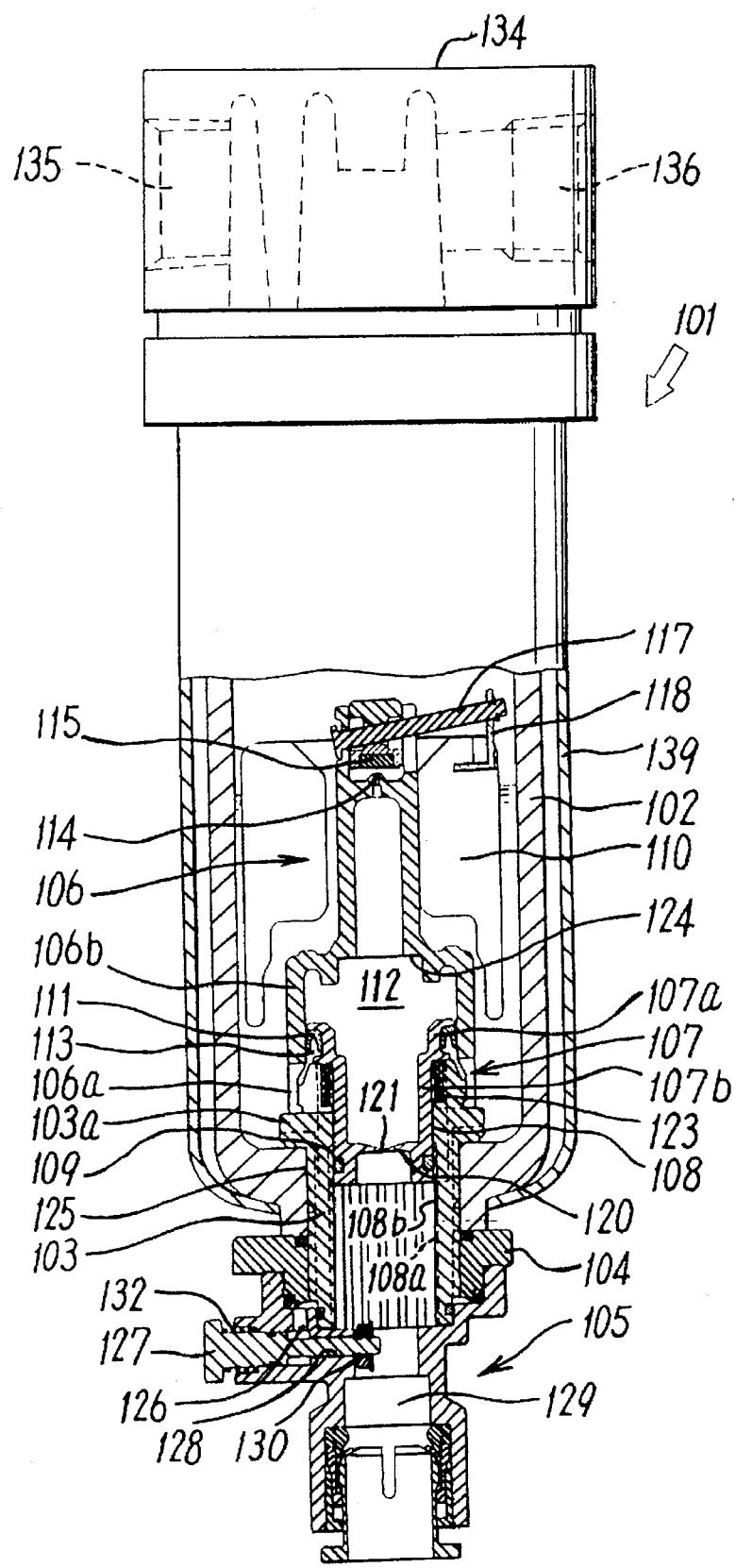
FIG. 9 is a view similar to FIG. 8, but showing the auto-drain in a drain discharging phase of operation.

Referring now to FIGS. 8 and 9, there is shown a fifth embodiment of the invention, which can be selectively arranged into either a normally closed type auto-drain or a normally open type auto-drain, mostly by the use of common component parts except for the selection of a normally closing spring or a normally opening spring.

Auto-drain 101 of the fifth embodiment is arranged to function as a normally closed type, including a drain reservoir case 102, a hollow discharge guide shaft 103 which is fitted in an opening at the lower end of the reservoir case 102, a fixation member 104 which is threaded on a fore end portion of the discharge guide shaft 103, and a pipe joint member 105 which is securely supported on the fixation member 104, the pipe joint member 105 having a manual valve integrally built thereinto. A hollow cylindrical piston 107 is slidably fitted in a lower larger-diameter portion 106b of a hollow float guide 106 which is contiguously erected on the discharge guide shaft 103. A drain valve body 109 in the form of an annular seal member is fitted on the outer periphery of a lower end portion of the piston 107. The drain valve body 109 is seated on and unseated off a drain valve seat 108 on the inner periphery of an upper end portion of the discharge guide shaft 103, for closing and opening a drain passage through the drain valve seat 108.

Similarly to the discharge guide shaft 3 of FIG. 3, the discharge guide shaft 103 is provided with a large number of axial drain discharge grooves 108a on its inner periphery beneath the drain valve seat 108, defining guide surfaces 108b for the drain valve body 109 between the respective drain discharge grooves 108a. These guide surfaces 108b are likewise arranged in a diameter substantially same as or slightly larger than the drain valve seat 108.

In this auto-drain, the float guide 106 which is mounted on the discharge guide shaft 103 is provided with a hollow guide shaft portion in an upper half of its body for guiding a float 110 up and down therealong. The piston 107 which is slidably received in the lower larger-diameter portion 106b of the float guide 106 has a seal member 111 fitted on the circumference of its upper larger-diameter portion 107a in sliding contact with the inner periphery of the float guide 106. The inner cavity of the float guide 106 is divided by the piston 107 into an upper pilot chamber 112 and a lower pressure chamber 113 in communication with the reservoir case 102 through radial intercommunicating slots 106a in the float guide 106.

Formed at the upper end of the guide shaft portion of the float guide 106 is a pilot valve seat 114 which opens into the pilot chamber 112. The pilot valve seat 114 is opened and closed by a pilot valve body 115 on a lever 117 which is rockably connected at one end to the upper end of the float guide 106 and at the other end to the float 110 by way of a holder member 118. Further, the piston 107 is internally provided with a radial partition wall 120 with an orifice 121 which is smaller in diameter than the pilot valve seat 114.

A normally closing spring 123 is charged between spring seats which are provided on the upper end of the discharge guide shaft 103 and the larger-diameter portion 107a of the piston 107, thereby to urge the piston 107 constantly toward the pilot chamber 112. As clear from FIG. 8, when the piston 107 is pushed up to an uppermost position within the float guide 106 by the biasing action of the normally closing spring 123, the drain valve body 109 at the lower end of the piston 107 is seated on the drain valve seat 108 on the discharge guide shaft 103.

Further, spring seats are also provided on and between a stepped surface 124 of the larger-diameter portion 106b of the float guide 106 and the partition wall of the piston 107 for a normally opening spring which is employed in a sixth embodiment as will be described hereinlater.

The discharge guide shaft 103 is provided with a flange 103a integrally at its upper end, which flange 103a being abutted against the bottom of the reservoir case 102 when the discharge guide shaft 103 is mounted in position within the latter. In this case, for the manual valve, the discharge guide shaft 103 is provided with a large number of drain discharge grooves 125 on and along the lower side of the flange 103a and circumferential surfaces of its shaft portion under the flange 103a and in engagement with the reservoir case 102 and the fixed member 104. The lower ends of the respective drain discharge grooves 125 are communicated with a drain passage 126 within the pipe joint member 105.

The pipe joint member 105 is provided with a drain passage 128 along the manual valve 127. Through this passage 128, the afore-mentioned drain passage 126 is communicated with a main drain passage 129 in the pipe Joint member 105 when the manual valve 127 is opened. The manual valve is provided with a seal ring 130 at its inner end, which is constantly urged toward a closed position by means of a spring 132. Therefore, upon depressing the manual valve 127 against the biasing force of the spring 132, the passage 128 is opened into the main drain passage 129 to start a manual discharging operation.

In the drawing, indicated at 134 is a piping manifold, at 135 is a pressurized air inlet, at 136 is a pressurized air outlet, and at 139 is a reservoir case guard.

In operation of the auto-drain of the above-described construction, when the reservoir case 102 is internally pressurized by influent pressurized air and the drain liquid level is at a low position, the float 110 is lowered to seat the pilot valve body 115 closed on the pilot valve seat 114. Since the pilot chamber is in communication with the outside through the orifice 121 in the partition wall 120 and the main passage 129, the piston 107 is moved upward under the influence of the biasing force of the normally closing spring 123 to close the drain valve body 109 on the drain valve seat 108.

As soon as the float 110 is lifted up as a result of elevation of the drain liquid level in the reservoir case 102 as shown in FIG. 9, the pilot valve body 115 is unseated to open the pilot valve seat 114, letting pressurized air in the reservoir case 102 flow into the pilot chamber 112 to build up an air pressure therein. When the air pressure is increased to overcome the biasing force of the normally closing spring 123, the piston 107 is lowered to unseat the drain valve body 109 off the drain valve seat 108, discharging the drain liquid in the reservoir case 102 to the outside through the radial slots 106a in the float guide 106, drain discharge grooves 108a on the discharge guide shaft 103 and the main passage 129 in the pipe Joint member 105.

When the drain liquid level in the reservoir case 102 has been dropped as a result of a drain discharging operation, the float 110 is lowered to close the pilot valve body 115 on The pilot valve seat 114. Whereupon, the air pressure in the pilot chamber 112 starts to drop due to gradual air bleeding from the pilot chamber 112 through the orifice 121. Therefore, at a point where the air pressure in the pilot chamber 112 is overcome by the biasing force of the normally closing spring 123, the piston 107 is moved upward to return to the position of FIG. 8, stopping the drain discharging.

Further, upon depressing the manual valve 127 on the pipe joint member 105, the seal ring 130 opens the drain passage 126 to discharge the drain liquid out of the reservoir case 102 through the main drain passage 129.

In this fifth embodiment, likewise the drain valve body 109 is slid in contact with the guide surfaces 108b between the respective drain discharge grooves 108a to ensure secure and stabilized upward and downward movements of the piston 107, precluding inclinations of the piston 107 during its upward and downward movements as well as dislocation of the drain valve body 109 off the piston 107 under the influence of gushing flows of the drain liquid being discharged.

Besides, as will be described hereinlater in connection with a sixth embodiment shown in FIGS. 10 and 11, the auto-drain can be changed into a normally open type by replacing only a small number of component parts including the normally closing spring 123 (and the optional pipe joint member with a built-in manual valve).

Figure 10:
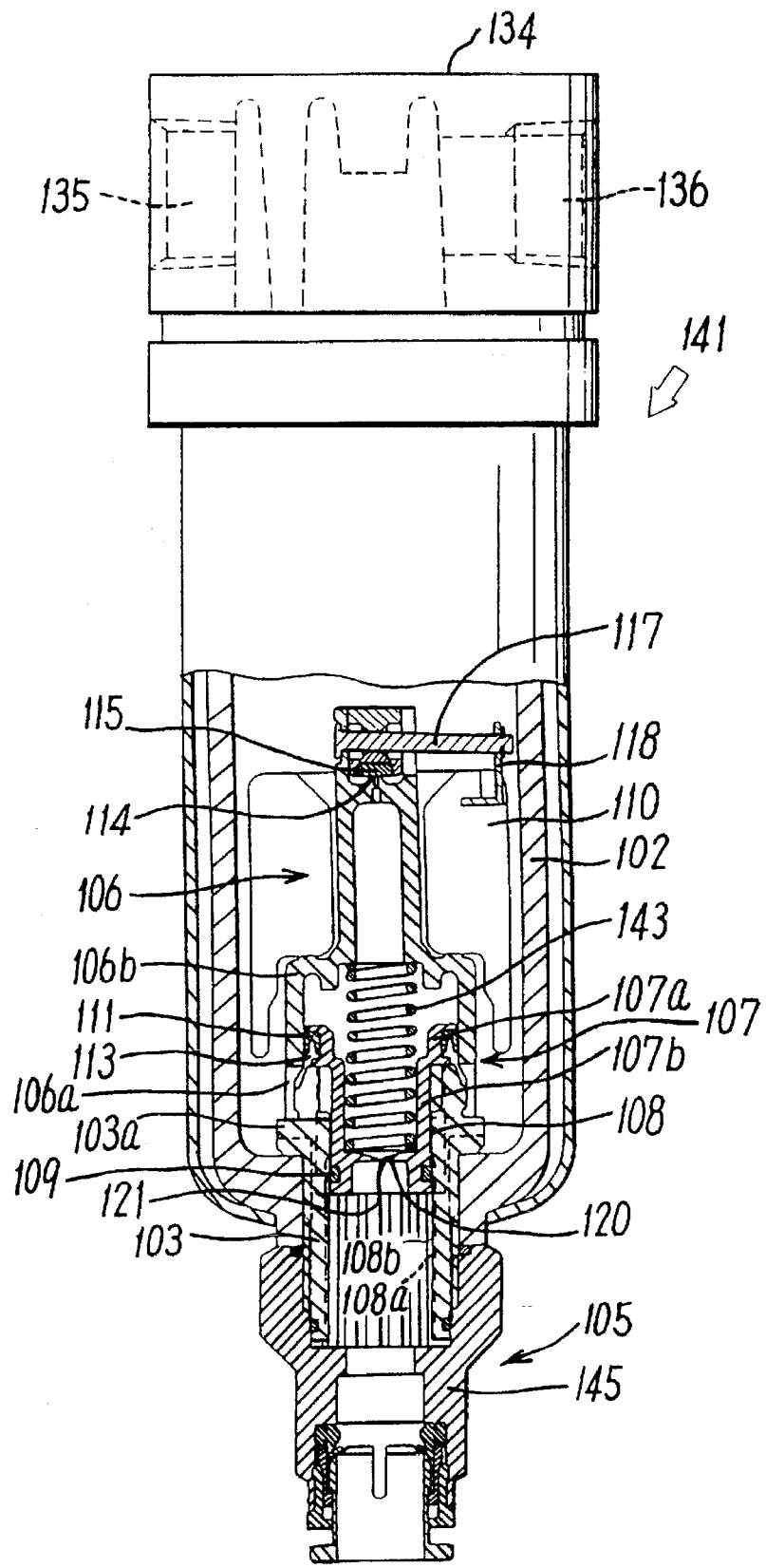
FIG. 10 is a vertically sectioned front view of a sixth embodiment of the invention, which is arranged as a normally open auto-drain.
Figure 11:
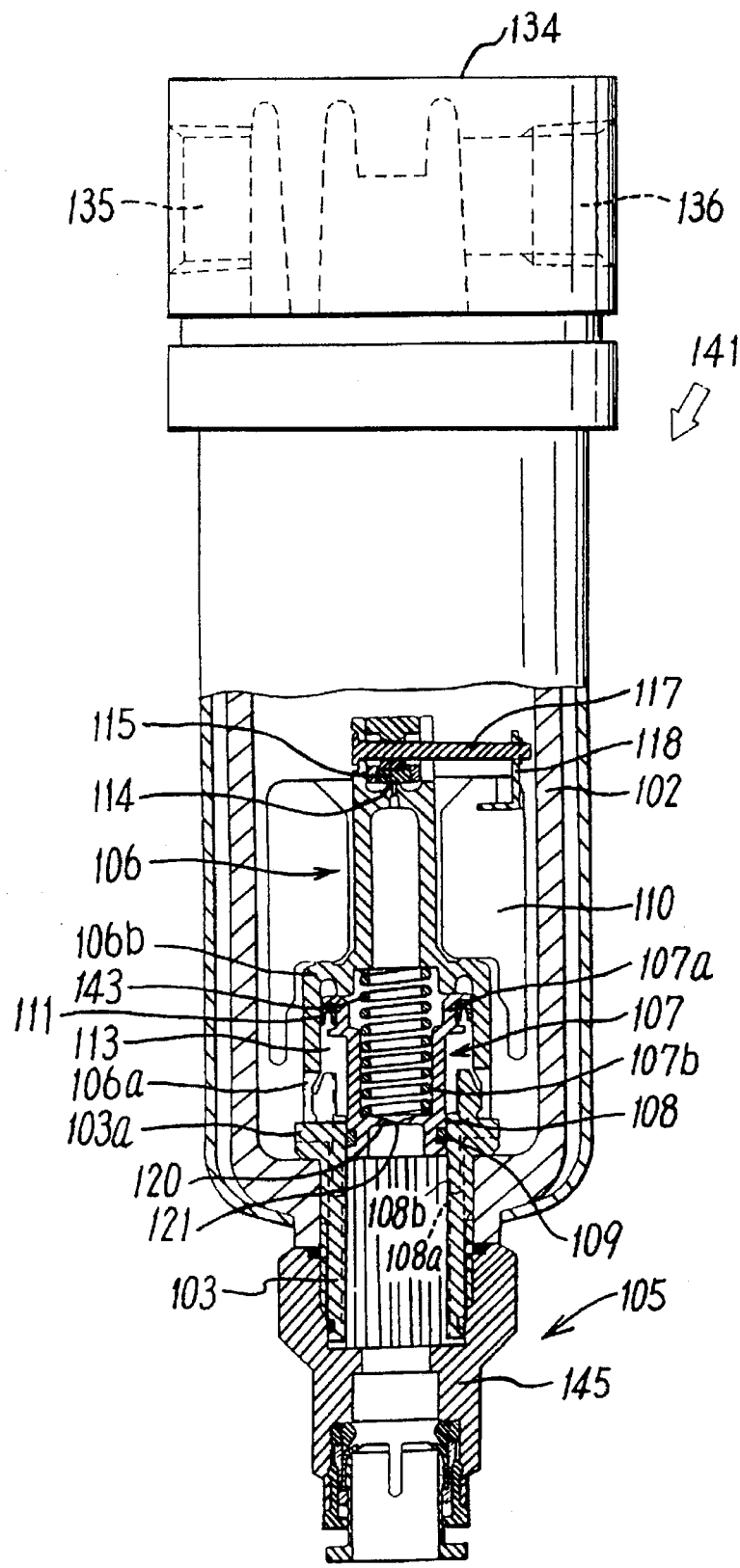
FIG. 11 is a view similar to FIG. 10, but showing the drain valve body of the auto-drain in a closed position.

Referring to FIGS. 10 and 11, there is shown a normally open type auto-drain 141, a sixth embodiment of the invention, in which a normally opening spring 143 is charged between springs seats on the stepped surface 124 of the larger-diameter portion 106b of the float guide 106 and the partition wall 120 in the piston 107 in place of the normally closing spring 123 of the above-described fifth embodiment. Besides, a simple pipe joint member 145 without a built-in manual valve is mounted on the lower end of the discharge guide shaft 103 instead of the pipe joint assembly 105 with a manual valve.

In other aspects, the normally open auto-drain 141 of the sixth embodiment is substantially same as the above-described normally closed auto-drain in construction, and can be built mostly by the use of component parts common with the normally closed type auto-drain. Therefore, equivalent component parts are simply designated by common reference numerals without repeating description on them.

In case of the auto-drain 141 of the sixth embodiment, when the reservoir case 102 is not internally pressurized by an influent air pressure, the piston 107 is moved downward as shown in FIG. 10 under the influence of the biasing force of the normally opening spring 143, unseating the drain valve body 109 off the valve seat 108. Therefore, the drain liquid is discharged to the outside without being stored in the reservoir case 102.

When the reservoir case 102 is internally pressurized by an influent air pressure, a pressure is built up in the pressure chamber 113 acting to push up the piston 107. As soon as this pressure overcomes the biasing force of the normally opening spring 143, the piston 107 is moved upward as shown in FIG. 11, closing the drain valve body 109 on the drain valve seat 108 to stop the drain discharge.

In the state shown in FIG. 11, if the drain liquid level within the reservoir case 102 rises, the auto-drain operates in the same manner as in the foregoing normally closed type of the fifth embodiment to discharge the drain liquid out of the reservoir case 102.

Figure 12:
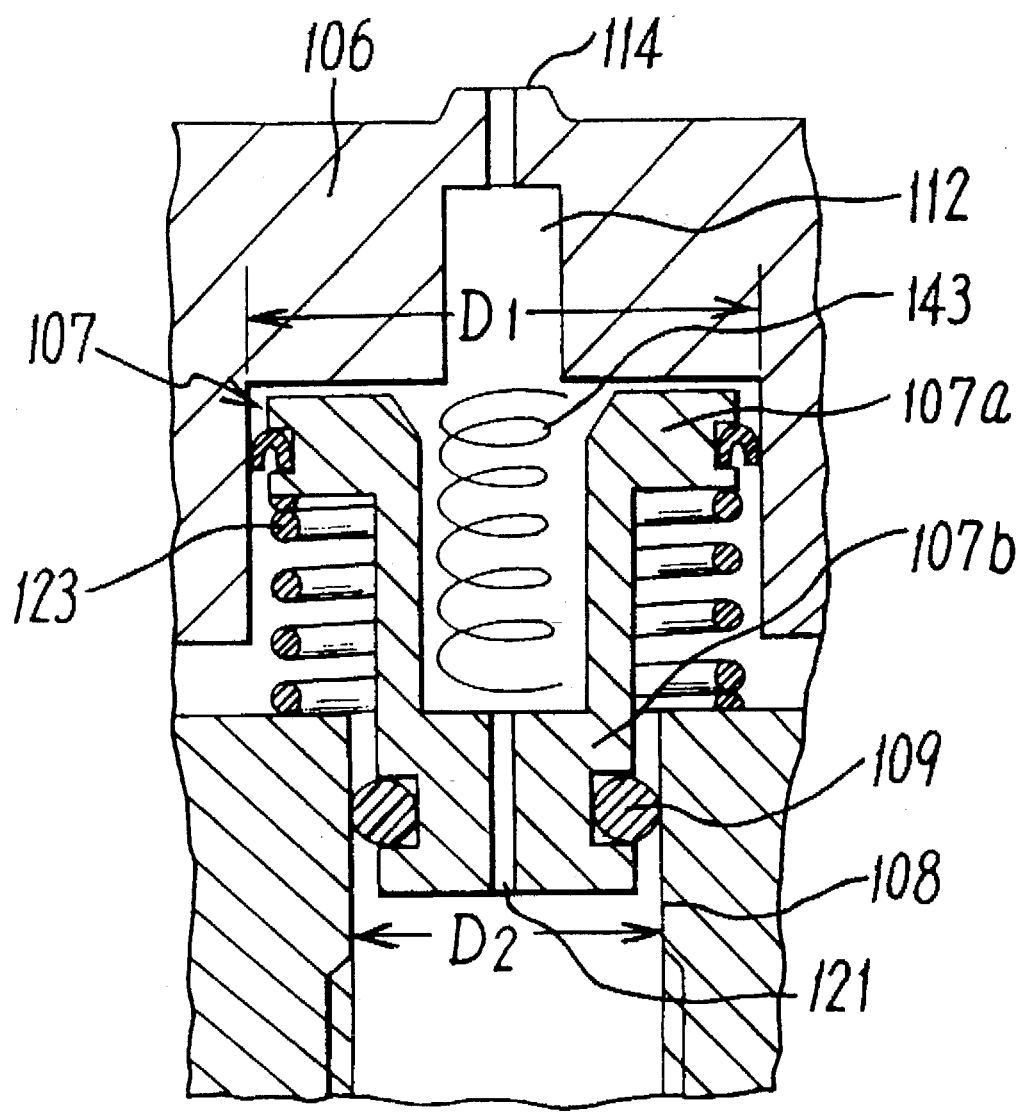
FIG. 12 is a schematic sectional view explanatory of the relations of opening and closing forces in the auto-drains of the fifth and sixth embodiments.

FIG. 12 schematically illustrates the operating mechanisms involved in the auto-drains of the fifth and sixth embodiments described above. In this instance, let P be the internal pressure of the drain reservoir case 102, $P_1$ the pressure in the pilot chamber 112, $D_1$ the diameter of the larger diameter portion 107a of the piston 107, $D_2$ the diameter of the smaller diameter portion 107b, $S_1$ the biasing force of the normally closing spring 123, $S_2$ the biasing force of the normally opening spring 143, $f_1$ the sliding resistance to the larger diameter portion 107a, and $f_2$ the sliding resistance to the smaller diameter portion 107b.

Firstly, in the case of the normally closed auto-drain 101, the upward and downward forces, which act on the piston 107 when the drain reservoir case 102 is in a non-pressurized state, are in the relations of $$S_1 > f_1 + f_2$$

When the drain reservoir case 102 is internally pressurized, the piston 107 is moved downward to start the drain discharging as soon as the relations of these forces acting on the piston 107 change to $$\{(D_1^2 - D_2^2)/4\}P + S_1 + f_1 + f_2 < (D_1^2 \times /4)P_1$$

When the float 110 is lowered as a result of the drain discharging to close the pilot valve body 115 on the pilot valve seat 114, the air supply to the pilot chamber 112 is cut off, while air is discharged through the orifice 121 to lower the air pressure in the pilot chamber 112. The piston 15 is moved upward to stop the drain discharging as soon as the relations of the acting forces change to $$\{(D_1^2 - D_2^2)/4\}P + S_1 > f_1 + f_2$$

On the other hand, in the case of the normally open auto-drain 141, when the drain reservoir case 102 is in a non-pressurized state, the piston 107 is moved downward to discharge the drain liquid because the forces opposingly acting on the piston 107 are in the relations of $$f_1 + f_2 < S_2$$

The piston 107 is moved upward to stop the drain discharging when the drain reservoir case 102 is internally pressurized to change the relations of the acting forces to $$\{(D_1^2 - D_2^2)/4\}P > f_1 + f_2 + S_2$$

The piston 107 is moved downward again to discharge the drain liquid as soon as the drain liquid level rises to a point which changes the relations of the acting forces to $\{(D_1{}^2-D_2{}^2)/4\}P+f_1+f_2<(D_1{}^2\times/4\}P_1+S_2$ Accordingly, there can be obtained an auto-drain which can operate either as a normally closed type or as a normally open type auto-drain by setting the diameters $D_1$ and $D_2$ of the larger and smaller diameter portions 107a and 107b of the piston 107 in such a manner as to satisfy all of the foregoing formulas and assembling the normally closing spring 123 or the normally opening spring 143 into the auto-drain assembly construction which is basically composed of common component parts.

Figure 13:
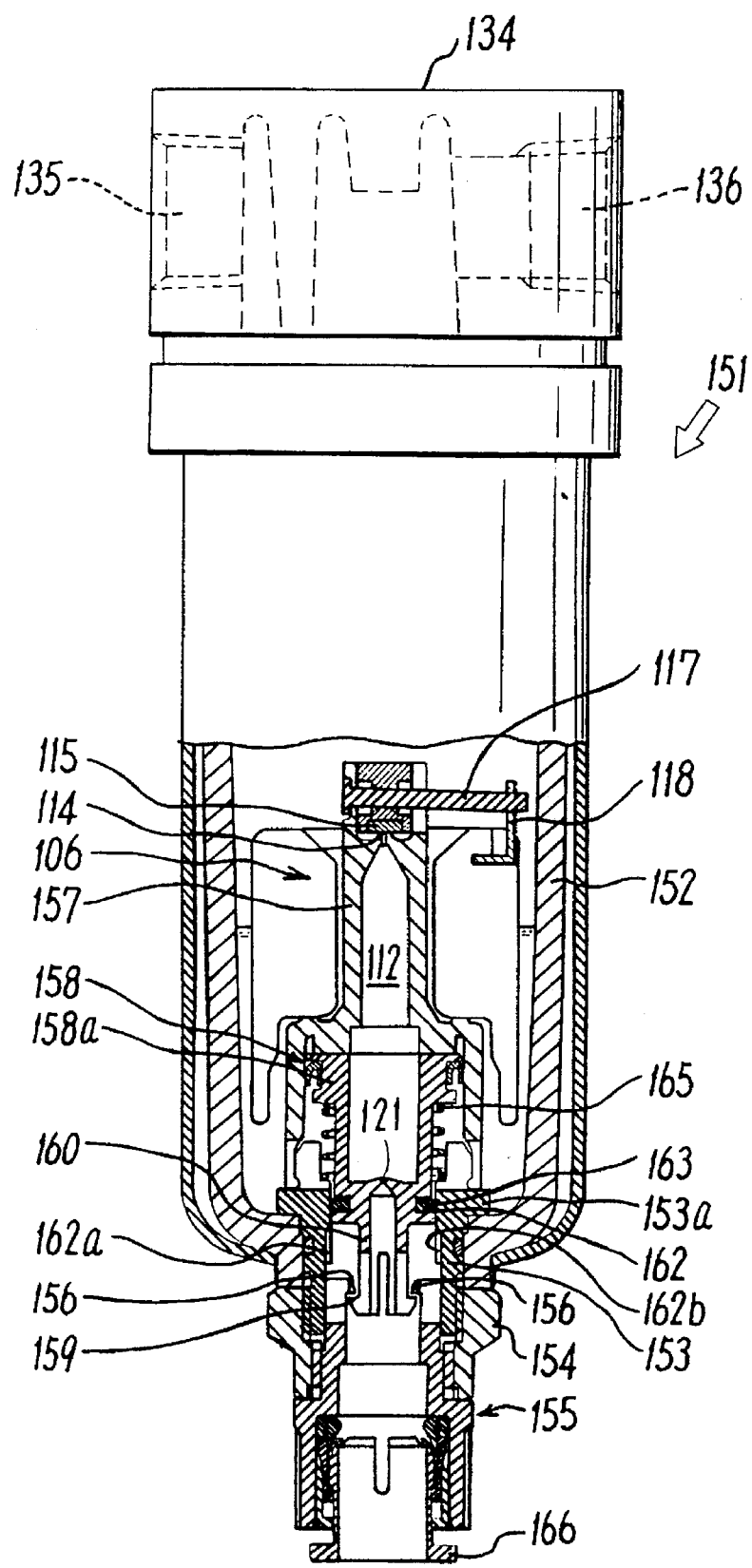
FIG. 13 is a vertically sectioned front view of a seventh embodiment of the invention, which is arranged as a normally closed auto-drain.

Shown in FIG. 13 is a seventh embodiment of the invention, which is arranged as a normally closed type auto-drain 151 and which is substantially same as the fifth embodiment of FIGS. 8 and 9 except for the provision of a manual discharging mechanism employing a manual operating member which can be interlocked with a piston at the time of a manual discharging operation through interlocking portions opposingly provided on the manual operating member and the piston.

The manual discharging mechanism includes: a fixation member 154 which is threaded onto the lower end of a hollow discharge guide shaft 153 to fix the latter in an opening at the bottom end of a drain reservoir case 152; and a manual operating member 155 which is unthreadably threaded into the fixation member and provided with an interlocking portion 156 at the inner end thereof, which interlocking portion 156 being provided with axial expansion slots so that it can undergo diametral contraction and, at the time of a manual discharging operation, being disengageably engageable with an interlocking portion 159 on a piston 158 which is slidably fitted in a float guide 157 which is in turn mounted on top of the discharge guide shaft 153. The interlocking portion 159 is provided at the lower end of a downward extension 160 of the piston 158, and divided into a number of segments by axial expansion slots so that it can undergo diametral contraction.

The above-mentioned expansion slots may be provided on only one of the two interlocking members, namely, on either the piston 158 or the manual operating member 155. Generally, the member which contains the expansion slots is formed of a resilient material like a resilient synthetic resin material, while the other member may be formed of an arbitrary material.

A drain valve seat 162 is provided on the inner periphery of an upper portion of the discharge guide shaft 153, and a drain valve body 163 in the form of an annular seal member is fitted on the piston 158 for opening and closing the drain valve seat 162. Similarly to the one described hereinbefore in connection with FIG. 3, the discharge guide shaft 153 is provided with axial drain discharge grooves 162a on its inner periphery under the drain valve seat 162, defining guide surface 162b for the drain valve body 163 between the respective drain discharge grooves 162a.

In this seventh embodiment with the above-described manual discharging mechanism, there is no need for providing a manual operating valve as in the fifth embodiment, so that the discharge guide shaft 153 is fixed in position by abutting a flange 153a, which is formed integrally at its upper end, directly on the bottom surface of the reservoir case 152. Further, in the auto-drain of the seventh embodiment which is arranged as a normally closed type, a normally closing spring 165 is charged between the discharge guide shaft 153 and a larger diameter portion 158a in an upper end of the piston 158, thereby constantly urging the piston 158 in the upward direction. In the drawing, the reference numeral 166 denotes a push-on type pipe joint member which is attached to the lower end of the manual operating member 155. This pipe joint member, however, may be replaced by a threading-in type pipe joint if desired.

In the auto-drain of the above arrangements, the piston 158 and the manual operating member 155 are formed of a resilient material like a resilient synthetic resin material so that, upon pressing the interlocking portions 159 and 156 toward each other, the interlocking portion 159 on the part of the piston 158 is fitted into an interlockable position within the interlocking portion 156 on the part of the manual operating member 155 through resilient deformation.

In order to manually discharge the drain liquid, the manual operating member 155 which is threaded into the fixation member 154 is turned in a predetermined direction. By so doing, the manual operating member 155 is moved downward, whereupon its interlocking portion 156 is brought into engagement with the interlocking portion 159 on the piston 158 to move the latter in the downward direction together with the manual operating member, unseating the drain valve body 163 off the drain valve seat 162 to discharge the drain liquid.

Upon turning the manual operating member 155 in the opposite direction, the piston 158 is moved upward under the influence of the biasing force of the normally closing spring 165 to stop the drain discharging.

In this manual drain discharging operation by way of the manual operating member 155, the drain liquid is discharged through the same drain discharge grooves 162a as used in automatic drain discharging operations, so that the drain discharge can be accomplished free of clogging of the drain discharge grooves or adhesion of the seal member which might occur in case the drain liquid is discharged through a drain discharge passage or passages which are separately provided exclusively for manual discharges. Besides, since it suffices to provide the interlocking portions 159 and 156 on the piston 158 and the manual operating member 155, the manual discharging mechanism is very simple in construction necessitating only a small number of component parts.

In this connection, the manual operating member 155 may be arranged to have a shorter downward stroke length than the piston 158 and to come out of threaded engagement with the fixation member 154 a little short of the lower dead end of the piston stroke, for the purpose of preventing damages which might otherwise be caused to the interlocking portions on the manual operating member and the piston at the lower dead end.

The above-described seventh embodiment of the invention is substantially same as the foregoing fifth embodiment in construction and operational effects, so that common or corresponding component parts are simply designated by common or corresponding reference numerals without repeating detailed descriptions in this regard.

Figure 14:
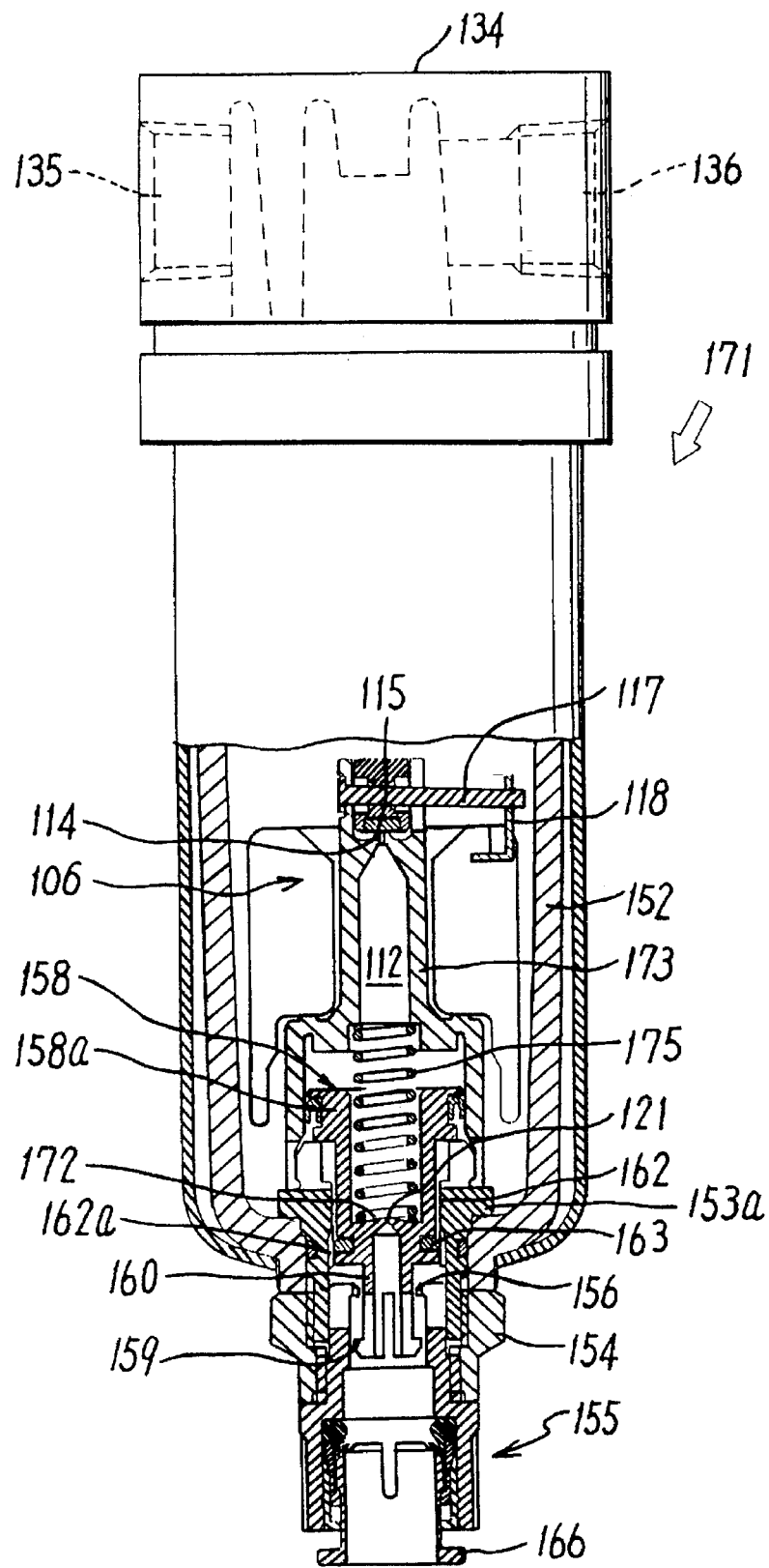
FIG. 14 is a vertically sectioned front view of an eighth embodiment of the invention, which is arranged as a normally closed auto-drain.
Figure 15:
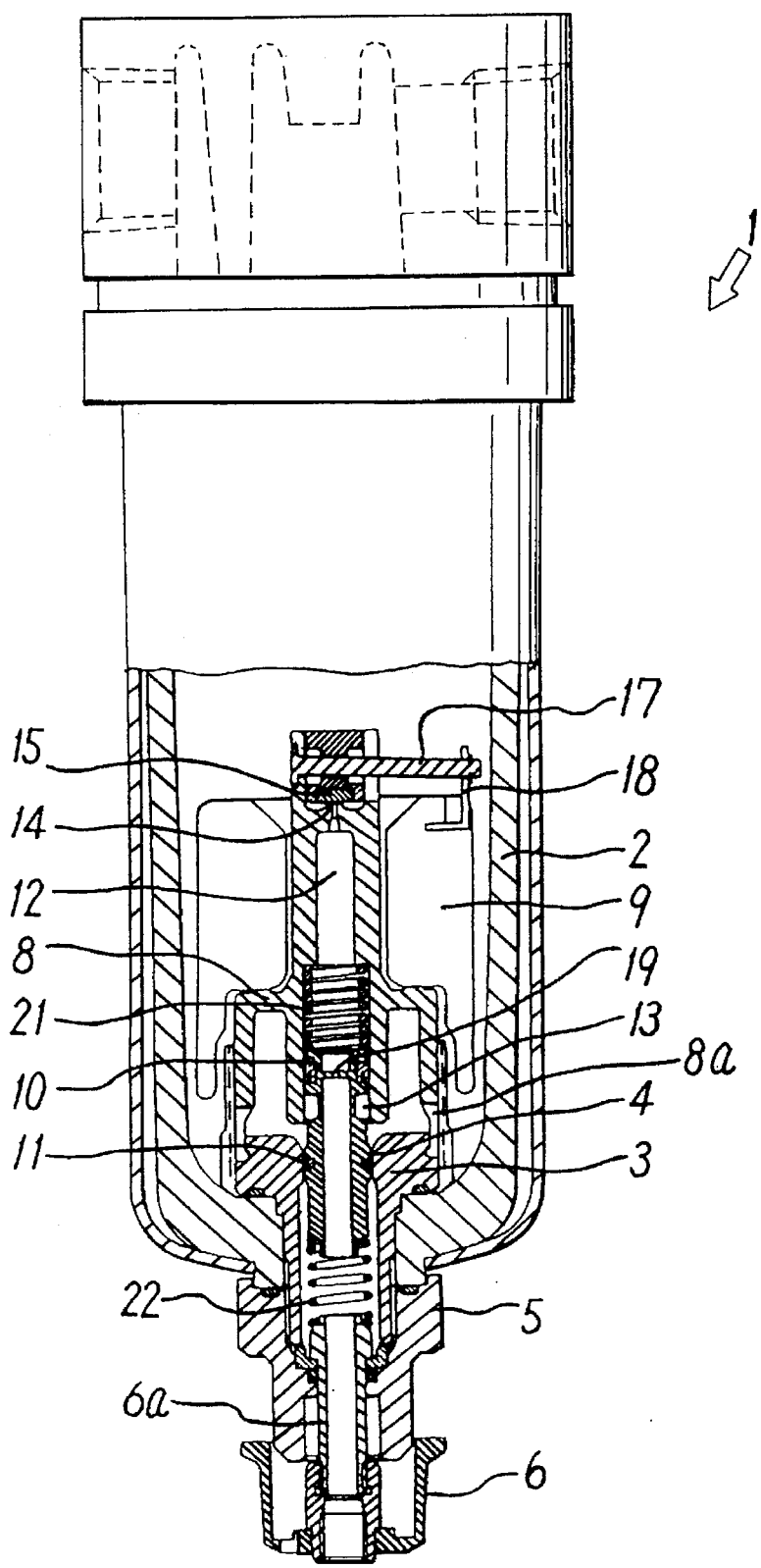
FIG. 15 is a vertically sectioned front view of a known auto-drain.

Shown in FIG. 14 is an eighth embodiment of the invention, which is arranged as a normally open auto-drain 171 incorporating a normally opening spring instead of the normally closing spring 165 of the foregoing seventh embodiment.

More specifically, in this case, the normally closing spring 165 in the auto-drain 151 of the seventh embodiment is replaced by a normally opening spring 175 which is charged between the partition wall 172 of the piston 158 and the float guide 173, urging the piston 158 constantly in the downward direction.

Except for the normally opening spring, this embodiment is same as the above-described auto-drain 151 in construction and constituted by same component parts. Accordingly, the differences in operation from the seventh embodiment are similar to the above-described differences of the sixth embodiment from the fifth embodiment. The equivalent or corresponding component parts as compared with the seventh embodiment are therefore designated by similar reference numerals without repeating detailed descriptions in this regard.

What is claimed is:

1. An auto-drainage assembly of the sort essentially including a drain reservoir case, a hollow discharge guide shaft fitted in an opening the bottom of said drain reservoir case, a drain valve seat formed in said discharge guide shaft for discharging a drain liquid therethrough, a piston slidably received in a pilot chamber in communication with said drain reservoir case through a pilot valve seat to be opened and closed in relation with upward and downward movements of a float within said drain reservoir case, and a drain valve body provided on the piston for opening and closing the drain valve seat, characterized in that said auto-drainage assembly comprises:

an annular seal member fitted on the outer periphery of said piston to serve as said drain valve body; and a large number of drain discharge grooves formed on the inner periphery of said discharge guide shaft alternately with guide surfaces to be brought into sliding contact with said drain valve body when unseated from said drain valve seat, said guide surfaces being arranged in a diameter which is one of substantially the same as and slightly larger than said drain valve seat.

2. An auto-drainage assembly as defined in claim 1 or comprising a drain valve seat provided in said discharge guide shaft at the bottom of said drain reservoir case for discharging a drain liquid therethrough, a hollow float guide erected on said discharge guide shaft for guiding a float up and down therealong, a piston slidably fitted in said float guide and defining a pilot chamber therein, a pilot valve seat opening into said pilot chamber, a pilot valve body disposed rockably and in face to face relation with said pilot valve seat to open and close same in relation with upward and downward movements of said float, and a drain valve body provided on said piston to open and close said drain valve seat by sliding movements of the piston.

3. An auto-drainage assembly as defined in claim 2, further comprising spring seats for a normally closing spring to be charged between said discharge guide shaft and said piston for biasing said piston in the direction of closing said drain valve body on said drain valve seat, along with spring seats for a normally opening spring to be charged in said pilot chamber between said float guide and said piston for biasing said piston in the direction of unseating said drain valve body from said drain valve seat.

4. An auto-drainage assembly as defined in claim 3, further comprising interlocking portions provided opposingly on said piston carrying said drain valve body and on a manual operating member inserted into said discharge guide shaft, said interlocking portions being engaged with each other upon moving said manual operating member in a downward direction, causing said piston to move downward together with said manual operating member to open said drain valve seat.

5. An auto-drainage assembly as defined in claim 2, further comprising interlocking portions provided opposingly on said piston carrying said drain valve body and on a manual operating member inserted into said discharge guide shaft, said interlocking portions being engaged with each other upon moving said manual operating member in a downward direction, causing said piston to move downward together with said manual operating member to open said drain valve seat.

6. An auto-drainage assembly as defined in claim 1, further comprising interlocking portions provided opposingly on said piston carrying said drain valve body and on a manual operating member inserted into said discharge guide shaft, said interlocking portions being engaged with each other upon moving said manual operating member in a downward direction, causing said piston to move downward together with said manual operating member to open said drain valve seat.

7. An auto-drainage assembly of the sort essentially including a drain reservoir case, a hollow discharge guide shaft fitted in an opening the bottom of said drain reservoir case, a drain valve seat formed in said discharge guide shaft for discharging a drain liquid therethrough, a piston slidably received in a pilot chamber in communication with said drain reservoir case through a pilot valve seat to be opened and closed in relation with upward and downward movements of a float within said drain reservoir case, and a drain valve body provided on the piston for opening and closing the drain valve seat, characterized in that said auto-drainage assembly comprises:

an annular seal member fitted in the inner periphery of said discharge guide shaft to serve as said drain valve seat; and a large number of drain discharge grooves formed on the circumferential surface of said drain valve body alternately with guide surfaces to be brought into sliding contact with said seal member when said drain valve body is unseated from said drain valve seat, said guide surfaces being arranged in a diameter which is one of substantially the same as and slightly smaller than said drain valve seat.

8. An auto-drainage assembly as defined in claim 7, comprising a drain valve seat provided in said discharge guide shaft at the bottom of said drain reservoir case for discharging a drain liquid therethrough, a hollow float guide erected on said discharge guide shaft for guiding a float up and down therealong, a piston slidably fitted in said float guide and defining a pilot chamber therein, a pilot valve seat opening into said pilot chamber, a pilot valve body disposed rockably and in face to relation with said pilot valve seat to open and close same in relation with upward and downward movements of said float, and a drain valve body provided on said piston to open and close said drain valve seat by sliding movements of the piston.

\* \* \* \* \*